United States Patent
Tzao et al.

(10) Patent No.: US 8,662,901 B2
(45) Date of Patent: Mar. 4, 2014

(54) SPORT GUIDING DEVICE AND SPORT GUIDING METHOD USING THE SAME

(75) Inventors: Szu-Han Tzao, Taipei (TW);
Chih-Chao Cheng, Taipei County (TW);
Ju-Chia Kuo, Taoyuan County (TW);
Jong-Jeng Hong, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 277 days.

(21) Appl. No.: 12/781,324

(22) Filed: May 17, 2010

(65) Prior Publication Data
US 2011/0151421 A1 Jun. 23, 2011

(30) Foreign Application Priority Data

Dec. 22, 2009 (TW) ................................ 98144317 A
Jan. 15, 2010 (TW) ................................ 99101114 A

(51) Int. Cl.
*A63B 69/36* (2006.01)
(52) U.S. Cl.
USPC ............................. 434/265; 434/255; 434/247
(58) Field of Classification Search
USPC .......................................... 434/247, 255, 265
See application file for complete search history.

(56) References Cited

U.S. PATENT DOCUMENTS

| | | | | |
|---|---|---|---|---|
| 3,846,704 A | * | 11/1974 | Bessette | 340/870.28 |
| 4,566,461 A | * | 1/1986 | Lubell et al. | 600/481 |
| 4,728,100 A | * | 3/1988 | Smith | 482/3 |
| 4,749,180 A | * | 6/1988 | Boomer | 482/51 |
| 5,724,265 A | * | 3/1998 | Hutchings | 702/141 |
| 5,788,655 A | * | 8/1998 | Yoshimura et al. | 600/587 |
| 6,213,872 B1 | * | 4/2001 | Harada et al. | 463/7 |
| 6,246,362 B1 | * | 6/2001 | Tsubata et al. | 342/357.35 |
| 6,450,955 B1 | | 9/2002 | Brown et al. | |
| 7,118,555 B2 | | 10/2006 | Leonard et al. | |
| 7,451,032 B2 | | 11/2008 | Brown et al. | |
| 7,645,212 B2 | * | 1/2010 | Ashby et al. | 482/8 |
| 7,980,456 B2 | * | 7/2011 | Boezaart | 235/95 C |
| 2002/0111737 A1 | | 8/2002 | Hoisko | |
| 2002/0128864 A1 | | 9/2002 | Maus et al. | |
| 2005/0054938 A1 | * | 3/2005 | Wehman et al. | 600/483 |
| 2006/0101983 A1 | * | 5/2006 | Boxer | 84/484 |
| 2006/0129308 A1 | | 6/2006 | Kates | |
| 2007/0113726 A1 | * | 5/2007 | Oliver et al. | 84/615 |
| 2008/0153671 A1 | * | 6/2008 | Ogg et al. | 482/3 |
| 2008/0188354 A1 | * | 8/2008 | Pauws et al. | 482/8 |
| 2008/0310579 A1 | * | 12/2008 | Boezaart | 377/24.2 |

FOREIGN PATENT DOCUMENTS

| | | |
|---|---|---|
| CN | 1921913 A | 2/2007 |
| JP | 2002024404 A | 1/2002 |
| JP | 2002051160 A | 2/2002 |
| TW | 201272 | 3/1993 |

(Continued)

*Primary Examiner* — Robert J Utama
(74) *Attorney, Agent, or Firm* — Rabin & Berdo, P.C.

(57) ABSTRACT

A sport guiding device and a sport guiding method using the same are provided. The sport guiding method includes the following steps. Two of a predetermined sport frequency intensity, a predetermined calorific capacity and a predetermined sport time are provided. A predetermined sport frequency curve is obtained according to two of the predetermined sport frequency intensity, the predetermined calorific capacity and the predetermined sport time. An actual sport frequency curve of a user is detected. If the actual sport frequency curve is deviated from the predetermined sport frequency curve for the predetermined level, then a tempo guiding signal is outputted.

13 Claims, 7 Drawing Sheets

(56) References Cited

FOREIGN PATENT DOCUMENTS

| TW | 403668 B | 9/2000 |
|----|----------|--------|
| TW | 2007-33934 | 3/2006 |
| TW | 200622195 A | 7/2006 |
| TW | I263488 | 10/2006 |
| TW | 2008-025803 | 6/2008 |
| TW | 201033587 A | 9/2010 |

* cited by examiner

SPORT GUIDING DEVICE AND SPORT GUIDING METHOD USING THE SAME

This application claims the benefits of Taiwan application Serial No. 98144317, filed Dec. 22, 2009 and Taiwan application Serial No. 99101114, filed Jan. 15, 2010, the subject matter of which is incorporated herein by reference.

BACKGROUND

1. Technical Field

The disclosure relates in general to a sport guiding device and a sport guiding method using the same, and more particularly to a sport guiding device adopting a sport frequency curve for control and a sport guiding method using the same.

2. Background

When people are actively participating in athletic pursuits, hereinafter "sports", what they concern most is how to complete their sport activity smoothly. The largest challenge to people actively participating in racing sports, such as jogging or cycling to find the rhythm and intensity frequency most suitable to their health conditions.

During sports activity, people may feel upset if they are unable to find a sport frequency that suits them most. However, people may find sports more interesting and are more willing to join or continue if they are able to find a frequency and rhythm that make them feel relaxed through a guiding mechanism.

SUMMARY

Accordingly, the disclosure is directed to a sport guiding device and a sport guiding method using the same. Through tempo guidance, people are guided to control their sport frequency and rhythm so as to have the best sport effect.

According to an embodiment of the disclosure, a sport guiding device is provided. The sport guiding device includes a supplying unit, a computation unit, a detection unit, a determination unit and a tempo unit. The supplying unit is for providing two of a predetermined sport frequency intensity, a predetermined calorific capacity and a predetermined sport time. The computation unit is for computing a predetermined sport frequency curve according to two of the predetermined sport frequency intensity, the predetermined calorific capacity and the predetermined sport time. The detection unit is for detecting an actual sport frequency curve of a user. The determination unit is for determining whether an actual sport frequency curve deviates from the predetermined sport frequency curve for a predetermined level. If the actual sport frequency curve deviates from the predetermined sport frequency curve for the predetermined level, then the tempo unit outputs a tempo guiding signal.

According to another embodiment of the disclosure, a sport guiding method using a sport guiding device. The sport guiding method includes the following steps. Two of a predetermined sport frequency intensity, a predetermined calorific capacity and a predetermined sport time are provided. A predetermined sport frequency curve is obtained according to two of the predetermined sport frequency intensity, the predetermined calorific capacity and the predetermined sport time. An actual sport frequency curve of a user is detected. If the actual sport frequency curve deviates from the predetermined sport frequency curve for a predetermined level, then a tempo guiding signal is outputted.

BRIEF DESCRIPTION OF THE DRAWINGS

The disclosure can be more fully understand by reading the subsequent detailed description and examples with references made to the accompanying drawings, wherein.

DETAILED DESCRIPTION

Figure 1:
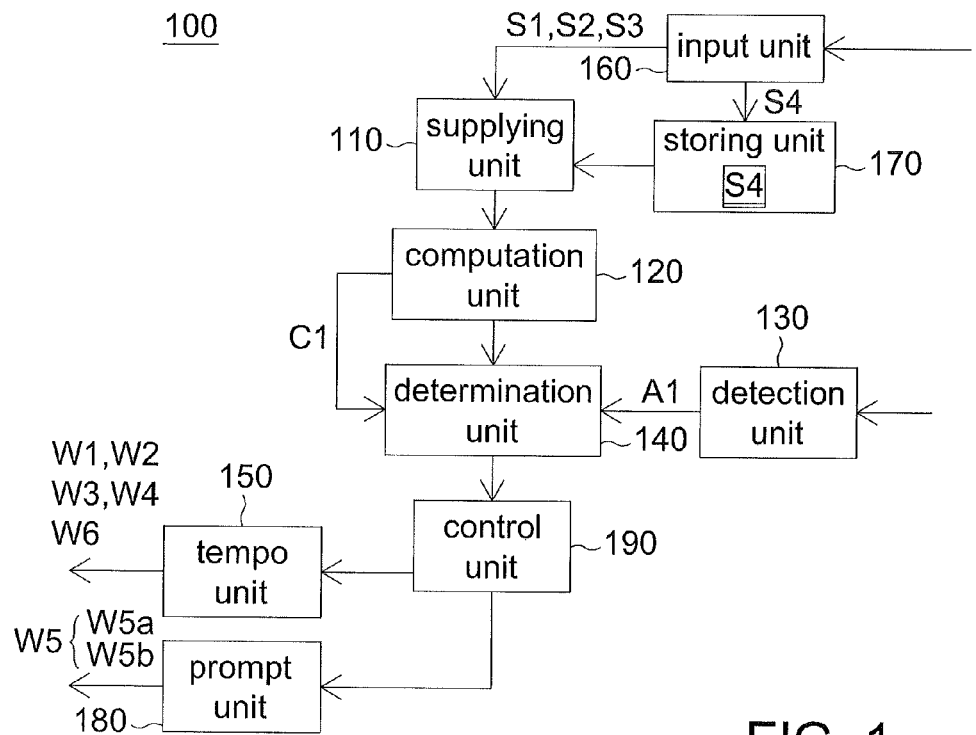
FIG. 1 is a schematic diagram of a sport guiding device of one embodiment.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing. Moreover, secondary elements are omitted in the embodiments to highlight the characteristics of the disclosure.

Referring to FIG. 1, a schematic diagram of a sport guiding device 100 of the one embodiment is shown. The sport guiding device 100 of the present embodiment of the disclosure includes an input unit 160, a storing unit 170, a supplying unit 110, a computation unit 120, a determination unit 140, a control unit 190, a detection unit 130 and a tempo unit 150. In an embodiment, the sport guiding device 100 further includes a prompt unit 180. The input unit 160 enables a user to input various types of information such as a keyboard, a mouse or a touch panel. The storing unit 170, such as a memory, a hard disc or a remote-end database, is for storing various types of information. The supplying unit 110 is for retrieving various types of information from the input unit 160 or the storing unit 170. The computation unit 120 is for executing various computation procedures. The determination unit 140 is for executing various determination procedures. The control unit 190 is for executing various control procedures. The computation unit 120, the determination unit 140 and the control unit 190 is such as a chip, a firmware circuit or a computer readable storage medium for storing programming codes. The detection unit 130, such as a vibration sensor, a shaking sensor or a pressing sensor, is for detecting the state of the user. The tempo unit 150, such as a film electrode pester, a beater or a vibrator, is for providing various tempo signals. In an embodiment in which the sport guiding device 100 includes the prompt unit 180, the prompt unit 180, such as a speaker or a headset, is for providing various audio signals with warning function.

The operations of various elements of the sport guiding device 100 of the present embodiment of the disclosure are disclosed in a flowchart below. However, anyone who is skilled in the technology of the present embodiment of the disclosure will understand that the operations and procedure sequence of the sport guiding device 100 of the present embodiment of the disclosure are not restricted by the flowchart.

Figure 2A:
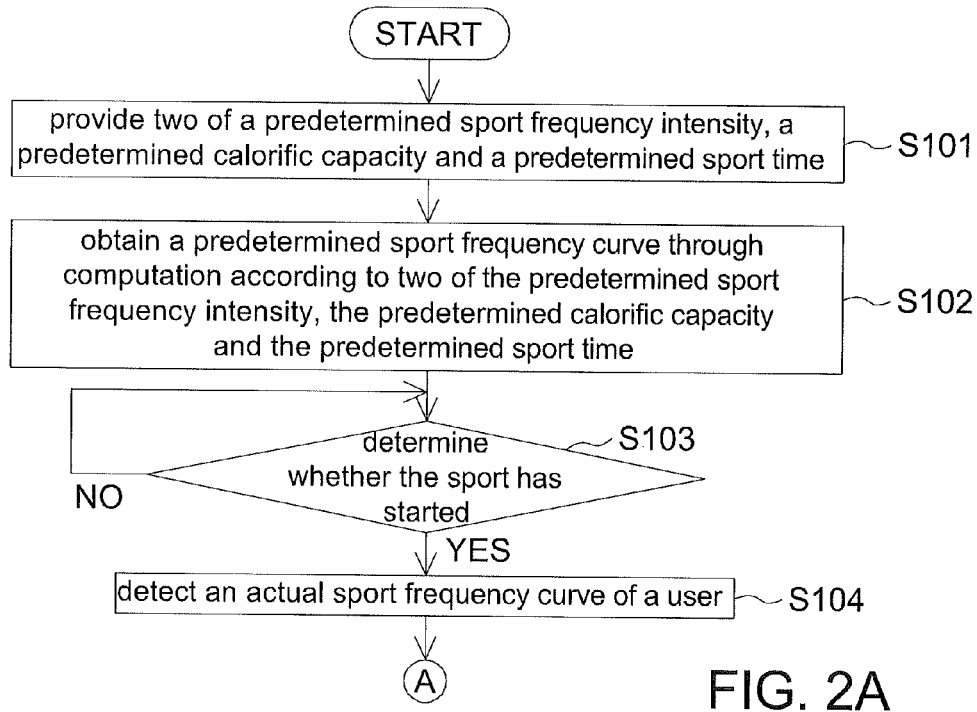
FIGS. 2A~2B are flowcharts of a sport guiding method of one embodiment.
Figure 2B:
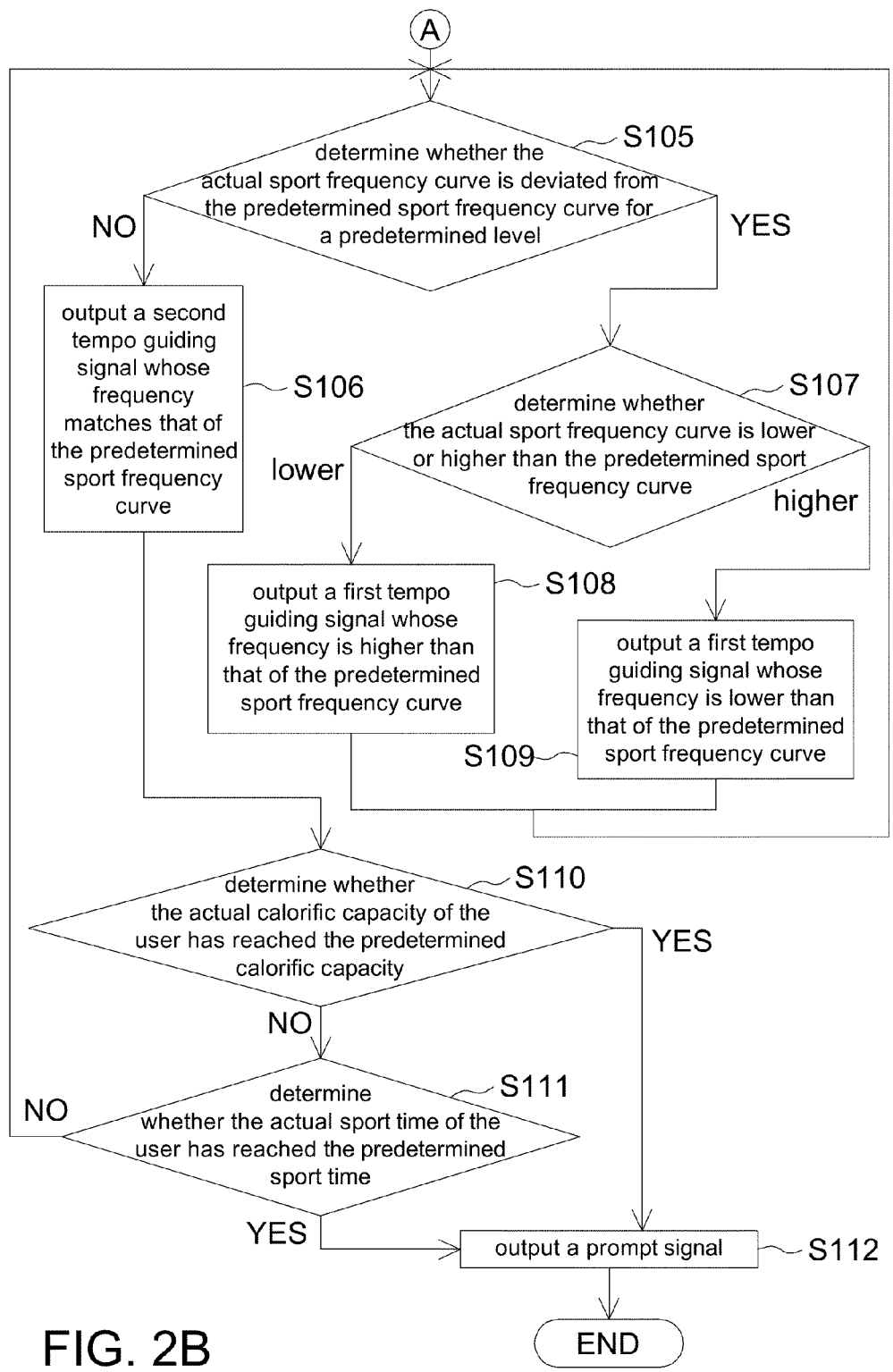

Referring to FIGS. 2A-2B, flowcharts of a sport guiding method of one embodiment are shown. Firstly, the method begins at step S101, two of a predetermined sport frequency intensity S1, a predetermined calorific capacity S2 and a predetermined sport time S3 are provided by the supplying unit 110. The predetermined sport frequency intensity S1 could include a predetermined sport frequency range and a predetermined sport frequency mode (a predetermined sport frequency variation situation).

Wherein, the input unit 160 of the present embodiment of the disclosure enables the user to select at least two of the predetermined sport frequency intensity S1, the predetermined calorific capacity S2 and the predetermined sport time S3, and the storing unit 170 is for storing a physiological information S4 of the user. The supplying unit 110 is for retrieving the predetermined sport frequency intensity S1, the predetermined calorific capacity S2 and the predetermined sport time S3 that are selected by the user from the input unit 160, and for retrieving the physiological information S4 of the user from the storing unit 170. In an embodiment, the supplying unit 110 could also retrieve the physiological information S4 inputted by the user from the input unit 160.

Then, the method proceeds to step S102, the computation unit 120 obtains a predetermined sport frequency curve C1 through computation according to two of the predetermined sport frequency intensity S1, the predetermined calorific capacity S2 and the predetermined sport time S3.

Figure 3:
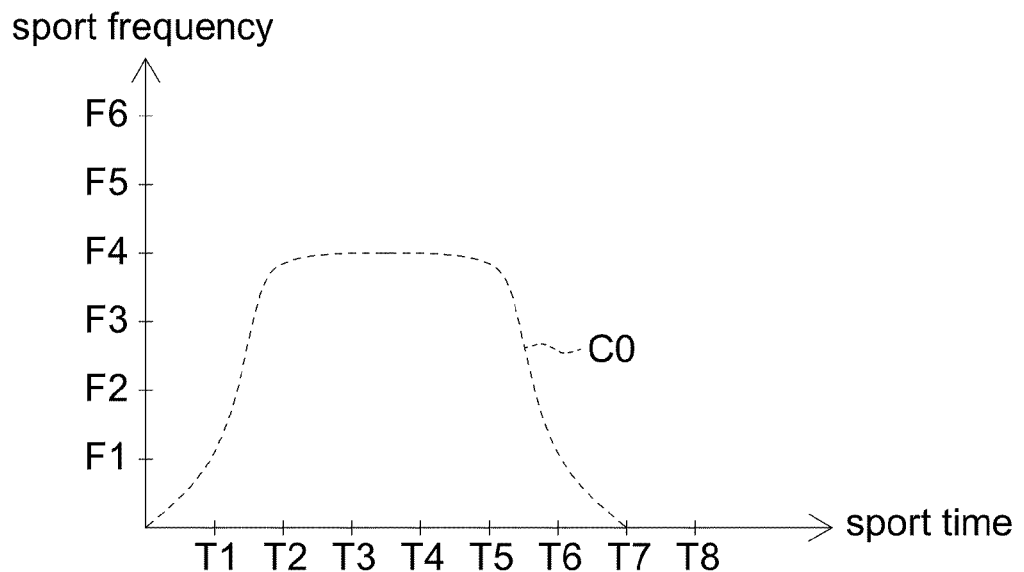
FIG. 3~5 is an example of obtaining a predetermined sport frequency curve.
Figure 4:
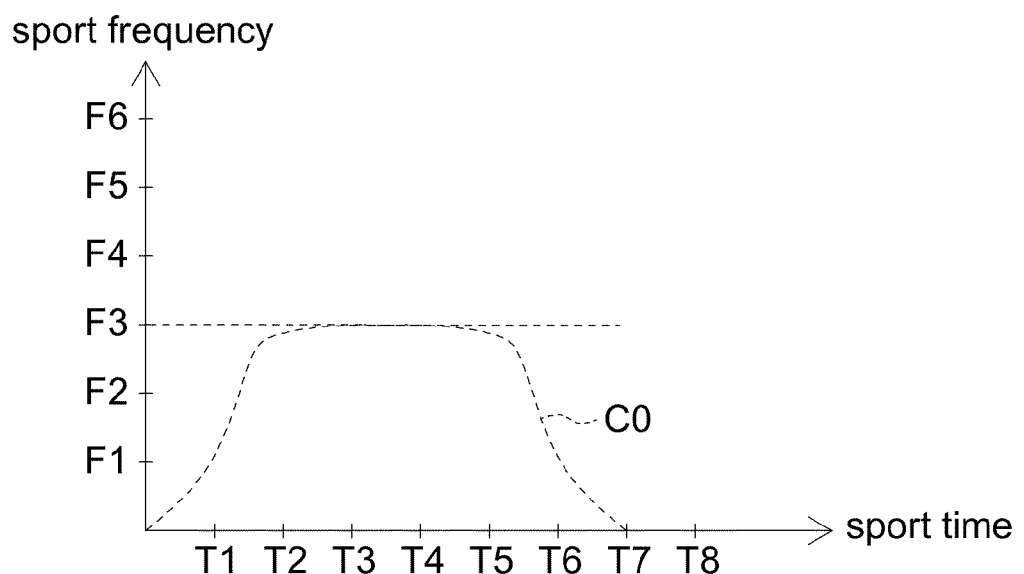
Figure 5:
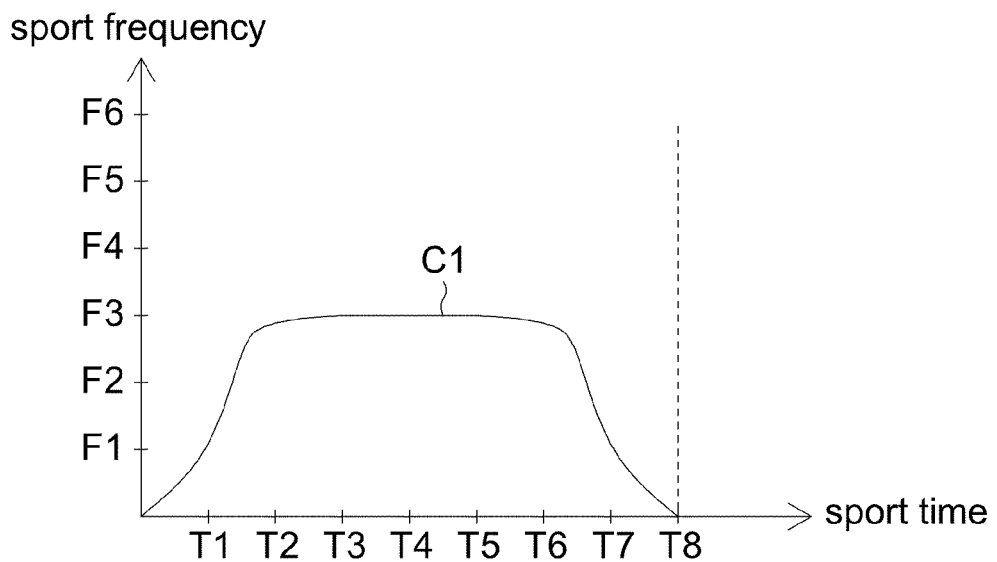

How the predetermined sport frequency curve C1 is obtained through computation is exemplified by an example below. Referring to FIGS. 3-5, an example of obtaining the predetermined sport frequency curve C1 is shown. As illustrated in FIG. 3, the vertical axis denotes the sport frequency, and the horizontal axis denotes the sport time. The shape of a curve C0 illustrated in FIG. 3 denotes different predetermined sport frequency modes (predetermined sport frequency variation situations), and the area under the curve C0 denotes the calorific capacity.

Firstly, as illustrated in FIG. 3, "the predetermined sport frequency mode (the sport frequency variation situation) as illustrated in FIG. 3" is selected by the user through the input unit 160. Meanwhile, the sport frequency range, calorific capacity and sport time of the curve C0 are provided by the computation unit 120 at random.

Next, as illustrated in FIG. 4, "the maximum of the predetermined sport frequency range being F3" is selected by the user through the input unit 160. Meanwhile, the highest frequency of the curve C0 is shifted to F3, and the setting of the predetermined sport frequency intensity S1 is done through the selection of the predetermined sport frequency mode (the sport frequency variation situation) and the predetermined sport frequency range.

Then, as illustrated in FIG. 5, "the predetermined sport time S3 being T8" is selected by the user through the input unit 160. Meanwhile, the finish time of the curve C0 is shifted to T8. When the predetermined sport frequency intensity S1 and the predetermined sport time S3 of the predetermined sport frequency curve C1 are given, the predetermined calorific capacity S2 could be obtained through computation. That is, the user only needs to input two of the predetermined sport frequency intensity S1, the predetermined calorific capacity S2 and the predetermined sport time S3, and the computation unit 120 will obtain the rest one so as to obtain the predetermined sport frequency curve C1.

Then, the method proceeds to step S103, whether the user has started to do sport is determined by the determination unit 140. If the user has started to do sport, then the method proceeds to step S104. If the user has not yet started to do sport, then the method returns to step S103.

Figure 6:
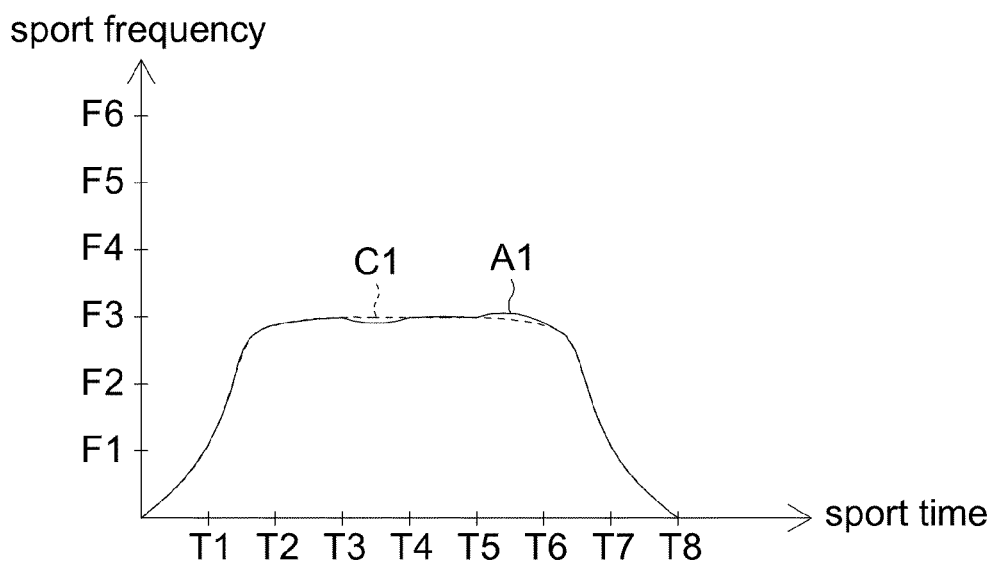
FIG. 6 is an example of an actual sport frequency curve of a user.

Afterwards, the method proceeds to step S104, an actual sport frequency curve of the user is detected by the detection unit 130. Referring to FIG. 6, an example of an actual sport frequency curve of the user A1 is shown. During actual sport, the user may not be able to follow the predetermined sport frequency curve C1, and the actual sport frequency curve A1 may occasionally be deviated from the predetermined sport frequency curve C1. In FIG. 6, the solid line denotes the actual sport frequency curve A1, and the dotted line denotes the predetermined sport frequency curve C1. Through the following procedures, the sport frequency curve A1 of the user will be corrected in time.

Then, the method proceeds to step S105, whether the actual sport frequency curve A1 is deviated from the predetermined sport frequency curve C1 for a predetermined level is determined by the determination unit 140. The predetermined level is such as 10%. If the actual sport frequency curve A1 is deviated from the predetermined sport frequency curve C1 for the predetermined level (such as the part of the actual sport frequency curve A1 corresponding to time T3-T4 as illustrated in FIG. 6), then the method proceeds to step S107. If the actual sport frequency curve A1 is not deviated from the predetermined sport frequency curve C1 for the predetermined level (such as the part of the actual sport frequency curve A1 corresponding to time T1-T2 as illustrated in FIG. 6), then the method proceeds to step S106.

Figure 7:
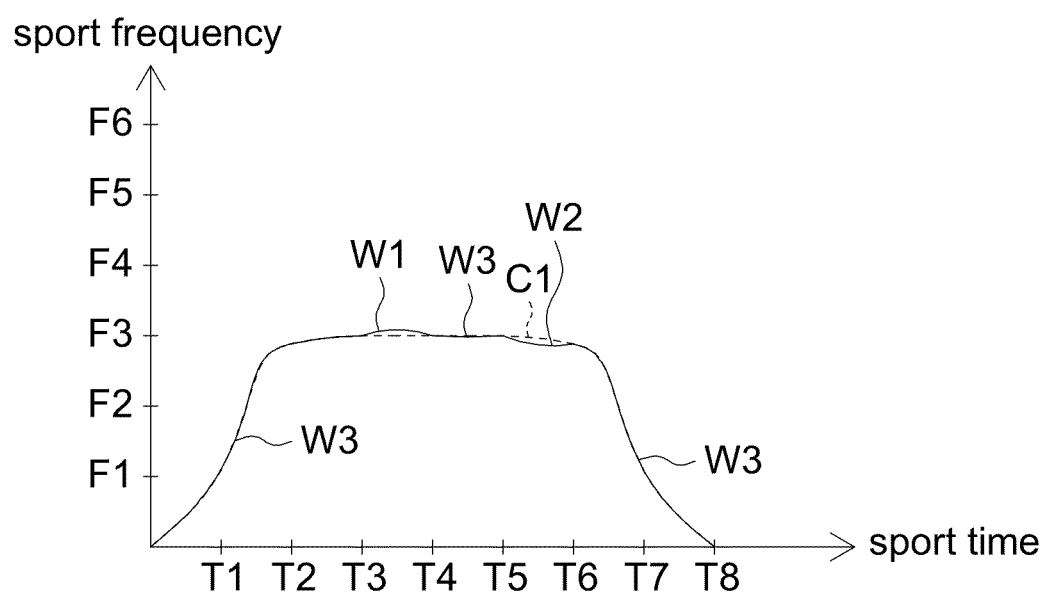
FIG. 7 is an example of a first tempo guiding signal and a second tempo guiding signal.

In step S107, whether the actual sport frequency curve A1 is lower or higher than the predetermined sport frequency curve C1 is determined by the determination unit 140. If the actual sport frequency curve A1 is lower than the predetermined sport frequency curve C1, then the method proceeds to step S108. If the actual sport frequency curve A1 is higher than the predetermined sport frequency curve C1, then the method proceeds to step S109. Referring to FIG. 7, an example of the first tempo guiding signals W1 and W2 and the second tempo guiding signal W3 is shown. In FIG. 7, the solid line denotes the first tempo guiding signals W1 and W2 and the second tempo guiding signal W3, the dotted line denotes the predetermined sport frequency curve C1.

In step S108, when the actual sport frequency curve A1 is lower than the predetermined sport frequency curve C1 for the predetermined level (such as the part of the actual sport frequency curve A1 corresponding to time T3-T4 as illustrated in FIG. 6), the control unit 190 controls the tempo unit 150 to immediately output the first tempo guiding signal W1, wherein the frequency of the first tempo guiding signal W1 is higher than the predetermined sport frequency curve C1. Thus, the user could be driven by a higher frequency and gradually increases the sport frequency so as to return to the predetermined sport frequency curve C1.

In step S109, when the actual sport frequency curve A1 is higher than the predetermined sport frequency curve C1 for the predetermined level (such as the part of the actual sport frequency curve A1 corresponding to time T5-T6 as illustrated in FIG. 6), the control unit 190 controls the tempo unit 150 to immediately output the first tempo guiding signal W2, wherein the frequency of the first tempo guiding signal W2 is lower than the predetermined sport frequency curve C1. Thus, the user could be driven by lower frequency and gradually reduces the sport frequency so as to return to the predetermined sport frequency curve C1.

In step S106, when the actual sport frequency curve A1 is not deviated from the predetermined sport frequency curve C1 for the predetermined level (such as the part of the actual sport frequency curve A1 corresponding to time T1-T2 as illustrated in FIG. 6), the control unit 190 controls the tempo unit 150 to output the second tempo guiding signal W3, wherein the frequency of the second tempo guiding signal W3 matches the predetermined sport frequency curve C1. Thus, the user could follow the second tempo guiding signal W3 in doing sport.

Then, the method proceeds to step S110, whether the actual calorific capacity of the user has reached the predetermined calorific capacity S2 is determined by the determination unit 140. If the actual calorific capacity of the user has not reached the predetermined calorific capacity S2, then the method proceeds to step S111; if the actual calorific capacity of the user has reached the predetermined calorific capacity S2, then the method proceeds to step S112.

Then, the method proceeds to step S111, whether the actual sport time of the user has reached the predetermined sport time S3 is determined by the determination unit 140. If the actual sport time of the user has reached a predetermined sport time S3, then the method proceeds to step S112. If the actual sport time of the user has not reached a predetermined sport time S3, then the method returns to step S105.

In step S112, a prompt signal W5 is outputted by the prompt unit 180. Through the determination in steps S110~S112, when the user reaches the predetermined calorific capacity S2 or the predetermined sport time S3, the control unit 190 controls the prompt unit 180 to immediately output the prompt signal W5 to remind the user to finish sport. In an embodiment, the prompt unit 180 is such as a speaker or a headset. The prompt signal W5 provided by the prompt unit 180 is an audio prompt signal W5a with warning function. In another embodiment, the prompt unit 180 is such as a film electrode pastor, a beater or a vibrator. The prompt signal W5 provided by the prompt unit 180 is a tempo prompt signal W5b with warning function. In another embodiment, the prompt unit 180 is such as a combination of an audio device and a tempo device. The prompt signal W5 provided by the prompt unit 180 includes an audio prompt signal W5a with warning function and a tempo prompt signal W5b with warning function. In another embodiment, the sport guiding device of the disclosure could omit the prompt unit 180, and when the user reaches the predetermined calorific capacity S2 or the predetermined sport time S3, the control unit 190 controls the tempo unit 150 to output a tempo prompt signal W6 with warning function to remind the user to finish sport. In another embodiment, the sport guiding device of the disclosure could provide an audio prompt signal W5a with warning function by the prompt unit 180 and provide a tempo prompt signal W6 with warning function by the tempo unit 150. In the above embodiments, the tempo prompt signal W5b and the tempo prompt signal W6 are such as a short and intermittent tempo signal which lasts for a predetermined time (such as 5 seconds), or regular and intermittent tempo signal which lasts for a predetermined time (such as 5 seconds).

In an embodiment, step S106 could be omitted, and after the determination unit 140 determines that the actual sport frequency curve A1 is deviated from the predetermined sport frequency curve C1 for the predetermined level, the method proceeds to step S107, and then outputs the first tempo guiding signal.

Figure 8:
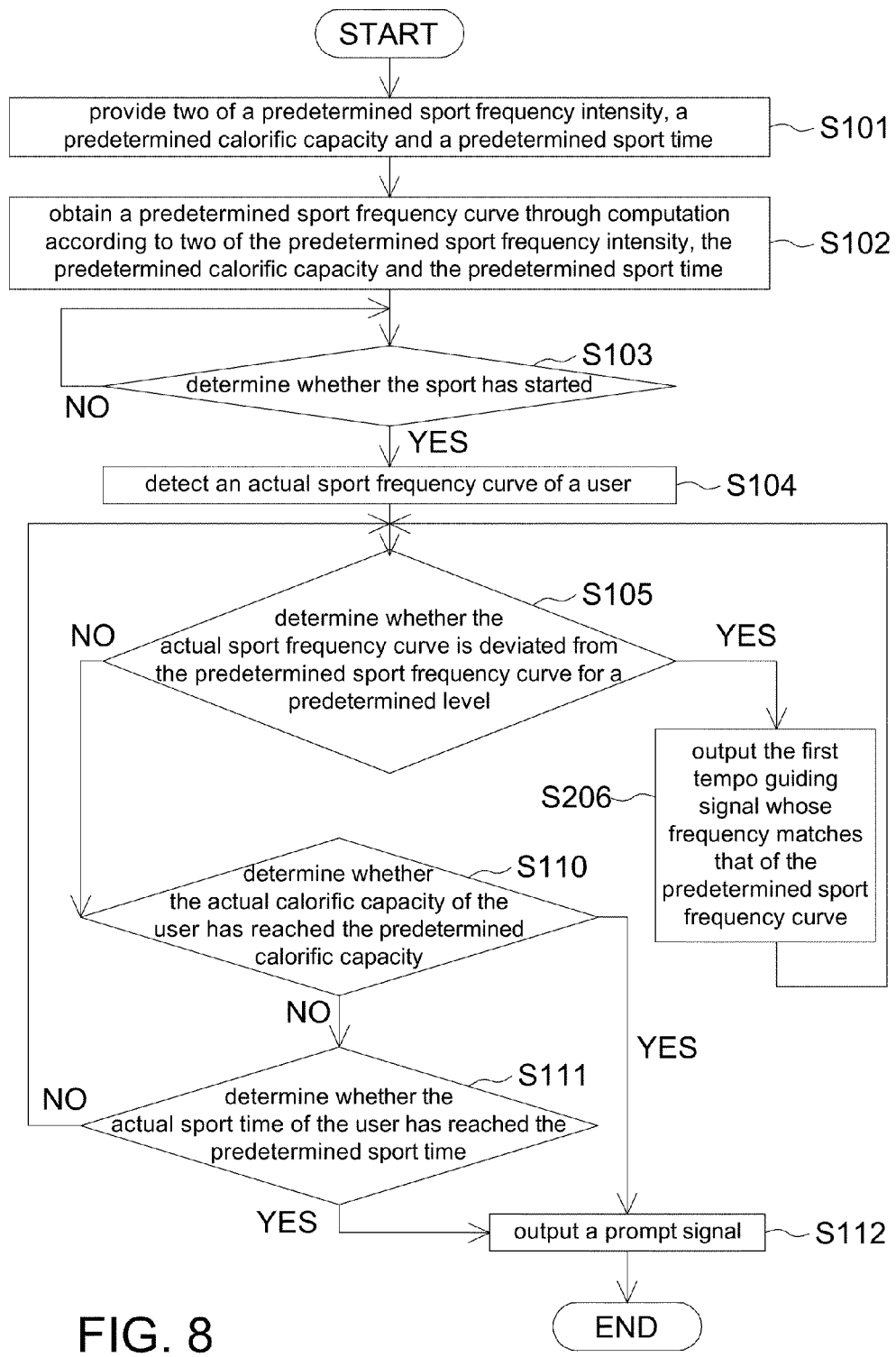
FIG. 8 is a flowchart of a sport guiding method of another embodiment.

Referring to FIG. 8, a flowchart of a sport guiding method of another embodiment is shown. The sport guiding method of the present embodiment of the disclosure is different from the sport guiding method of the embodiment mentioned above in that step S106 is omitted, steps S107-S109 are replaced with step S206, and the similarities are not repeated here.

Figure 9:
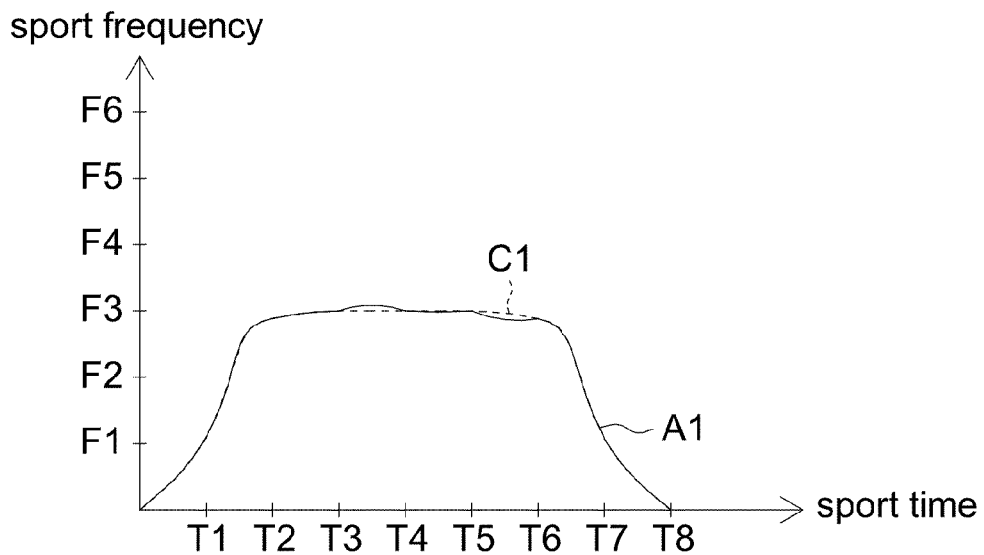
FIG. 9 is an example of an actual sport frequency curve of a user.

In steps S101-S104, the predetermined sport frequency curve C1 is obtained by the computation unit 120 through computation, and an actual sport frequency curve A1 of the user is detected by the detection unit 130. Referring to FIG. 9, an example of an actual sport frequency curve A1 of the user is shown. During actual sport, the user may not be able to follow the predetermined sport frequency curve C1, and the actual sport frequency curve A1 may occasionally be deviated from the predetermined sport frequency curve C1. In FIG. 9, the solid line denotes the actual sport frequency curve A1, and the dotted line denotes the predetermined sport frequency curve C1. Through the following procedures, the sport frequency curve A1 of the user will be corrected in time.

Figure 10:
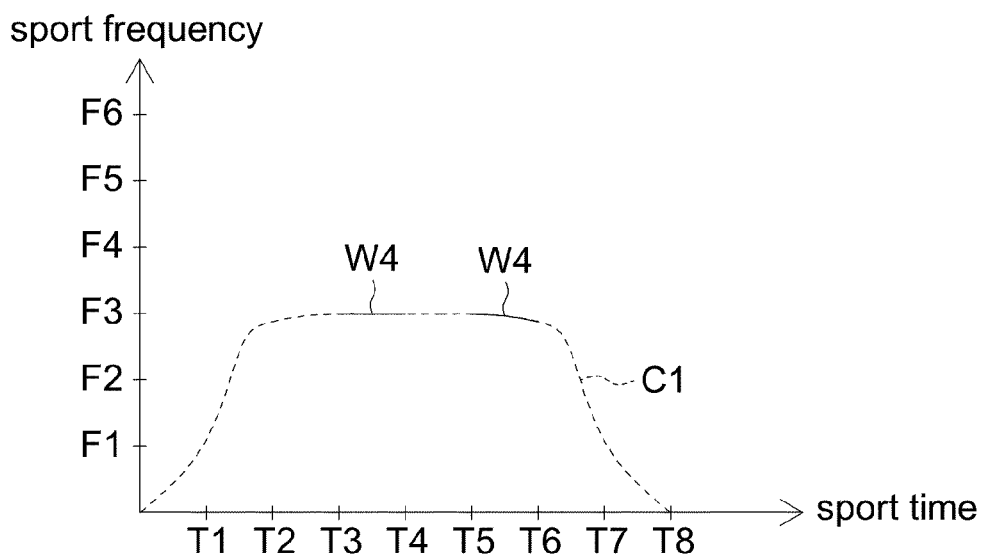
FIG. 10 is an example of a first tempo guiding signal.

Then, the method proceeds to step S105, whether the actual sport frequency curve A1 is deviated from the predetermined sport frequency curve C1 for a predetermined level is determined by the determination unit 140. If the actual sport frequency curve A1 is deviated from the predetermined sport frequency curve for the predetermined level (such as the part of the actual sport frequency curve A1 corresponding to time T3-T4 as illustrated in FIG. 9), then the method proceeds to step S206. If the actual sport frequency curve A1 is not deviated from the predetermined sport frequency curve C1 for the predetermined level (such as the part of the actual sport frequency curve A1 corresponding to time T1-T2 as illustrated in FIG. 9), then the method directly proceeds to step S110. Referring to FIG. 10, an example of a first tempo guiding signal W4 is shown. In FIG. 10, the solid line denotes the first tempo guiding signal W4, and the dotted line denotes the predetermined sport frequency curve C1.

In step S206, when the actual sport frequency curve A1 is deviated from the predetermined sport frequency curve C1 the predetermined level (such as the part of the actual sport frequency curve A1 corresponding to the time T3-T4 as illustrated in FIG. 9), the control unit 190 controls the tempo unit 150 to output the first tempo guiding signal W4, wherein the frequency of the first tempo guiding signal W4 matches the predetermined sport frequency curve C1. Thus, the user could be guided back to the predetermined sport frequency curve C1.

While the disclosure has been described by way of example and in terms of several embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sport guiding device, comprising:
an input unit enabling the user to select two of a predetermined sport frequency intensity, a predetermined calorific capacity and a predetermined sport time, wherein the predetermined sport frequency intensity comprises a predetermined sport frequency range and a predetermined sport frequency variation situation;
a supplying unit for providing two of the predetermined sport frequency intensity, the predetermined calorific capacity and the predetermined sport time, wherein the supplying unit retrieves the two of the predetermined sport frequency intensity, the predetermined calorific capacity and the predetermined sport time from the input unit;
a computation unit for computing a predetermined sport frequency curve according to two of the predetermined sport frequency intensity, the predetermined calorific capacity and the predetermined sport time;
a detection unit for detecting an actual sport frequency curve of a user;

a determination unit for determining whether the actual sport frequency curve is deviated from the predetermined sport frequency curve for a predetermined level; and a tempo unit for outputting a first tempo guiding signal if the actual sport frequency curve is deviated from the predetermined sport frequency curve for the predetermined level;

wherein the computation unit computes the predetermined sport frequency curve according to the two of the predetermined sport frequency intensity, the predetermined calorific capacity and the predetermined sport time by:

providing a sport frequency range, a calorific capacity and a sport time of a curve at random as the predetermined sport frequency mode is input through the input unit, shifting a highest frequency of the sport frequency range of the curve to a maximum of the predetermined sport frequency range as the predetermined sport frequency range is input through the input unit, and shifting a finish time of the sport time of the curve to the predetermined sport time and computing the predetermined calorific capacity according to the predetermined sport frequency intensity and the predetermined sport time as the predetermined sport time is input through the input unit.

2. The sport guiding device according to claim 1, wherein if the actual sport frequency curve is not deviated from the predetermined sport frequency curve for the predetermined level, then the tempo unit outputs a second tempo guiding signal, and the frequency of the second tempo guiding signal matches the predetermined sport frequency curve.

3. The sport guiding device according to claim 1, wherein if the actual sport frequency curve is lower than the predetermined sport frequency curve for the predetermined level, then the frequency of the first tempo guiding signal is higher than the predetermined sport frequency curve; and if the actual sport frequency curve is higher than the predetermined sport frequency curve for the predetermined level, then the frequency of the first tempo guiding signal is lower than the predetermined sport frequency curve.

4. The sport guiding device according to claim 1, wherein the frequency of the first tempo guiding signal matches the predetermined sport frequency curve.

5. The sport guiding device according to claim 1, wherein the supplying unit further provides a physiological information of the user.

6. The sport guiding device according to claim 5, further comprising:

a storing unit for storing the physiological information of the user;

wherein, the supplying unit retrieves two of the predetermined sport frequency intensity, the predetermined calorific capacity and the predetermined sport time from the storing unit.

7. The sport guiding device according to claim 1, wherein the determination unit further determines whether an actual calorific capacity of the user has reached the predetermined calorific capacity, or determines whether an actual sport time of the user has reached the predetermined sport time, and the sport guiding device further comprises:

a prompt unit for outputting a prompt signal being an audio prompt signal or a tempo prompt signal if the actual sport frequency curve is deviated from the predetermined sport frequency curve for the predetermined level, the actual calorific capacity has reached the predetermined calorific capacity, or the actual sport time of the user has reached the predetermined sport time.

8. The sport guiding device according to claim 1, wherein the determination unit further determines whether an actual calorific capacity of the user has reached the predetermined calorific capacity, or determines whether an actual sport time of the user has reached the predetermined sport time, and if the actual calorific capacity has reached the predetermined calorific capacity, or the actual sport time of the user has reached the predetermined sport time, then the tempo unit outputs a tempo prompt signal.

9. A sport guiding method using a sport guiding device, wherein the method comprises:

providing two of a predetermined sport frequency intensity, a predetermined calorific capacity and a predetermined sport time, wherein the predetermined sport frequency intensity comprises a predetermined sport frequency range and a predetermined sport frequency variation situation;

obtaining a predetermined sport frequency curve through computation according to two of the predetermined sport frequency intensity, the predetermined calorific capacity and the predetermined sport time, including:

providing a sport frequency range, a calorific capacity and a sport time of a curve at random as the predetermined sport frequency mode of the curve is provided, shifting a highest frequency of the sport frequency range of the curve to a maximum of the predetermined sport frequency range as the predetermined sport frequency range is provided, shifting a finish time of the sport time of the curve to the predetermined sport time as the predetermined sport time is provided, computing the predetermined calorific capacity according to the predetermined sport frequency intensity and the predetermined sport time, and obtaining the predetermined sport frequency curve;

detecting an actual sport frequency curve of a user; and outputting a first tempo guiding signal if the actual sport frequency curve is deviated from the predetermined sport frequency curve for a predetermined level.

10. The sport guiding method according to claim 9, further comprising:

outputting a second tempo guiding signal if the actual sport frequency curve is not deviated from the predetermined sport frequency curve for the predetermined level, wherein the frequency of the second tempo guiding signal matches the predetermined sport frequency curve.

11. The sport guiding method according to claim 9, wherein if the actual sport frequency curve is lower than the predetermined sport frequency curve for the predetermined level, then the frequency of the first tempo guiding signal is higher than the predetermined sport frequency curve; and if the actual sport frequency curve is higher than the predetermined sport frequency curve for the predetermined level, then the frequency of the first tempo guiding signal is lower than the predetermined sport frequency curve.

12. The sport guiding method according to claim 9, wherein the frequency of the first tempo guiding signal matches the predetermined sport frequency curve.

13. The sport guiding method according to claim 9, further comprising:

outputting a prompt signal, the prompt signal being an audio prompt signal or a tempo prompt signal if the actual sport frequency curve is deviated from the predetermined sport frequency curve for the predetermined level, an actual calorific capacity of the user has reached the predetermined calorific capacity, or an actual sport time of the user has reached the predetermined sport time.

* * * * *